US011949082B2

(12) United States Patent
Obasih et al.

(10) Patent No.: US 11,949,082 B2
(45) Date of Patent: Apr. 2, 2024

(54) THERMAL MANAGEMENT SYSTEM FOR A BATTERY MODULE (71) Applicant: CPS Technology Holdings LLC, New York, NY (US)

(72) Inventors: Kem M. Obasih, Brookfield, WI (US); Richard M. DeKeuster, Racine, WI (US); Nicholas E. Elison, Mequon, WI (US); Jason D. Fuhr, Sussex, WI (US)

(73) Assignee: CPS Technology Holdings LLC, New York, NY (US)

( * ) Notice: Subject to any disclaimer, the term of this patent is extended or adjusted under 35 U.S.C. 154(b) by 568 days.

(21) Appl. No.: 17/045,447

(22) PCT Filed: Mar. 29, 2019

(86) PCT No.: PCT/US2019/024996
§ 371 (c)(1),
(2) Date: Oct. 5, 2020

(87) PCT Pub. No.: WO2019/195119
PCT Pub. Date: Oct. 10, 2019

(65) Prior Publication Data
US 2021/0167439 A1 Jun. 3, 2021

Related U.S. Application Data

(60) Provisional application No. 62/654,091, filed on Apr. 6, 2018.

(51) Int. Cl.
*H01M 10/6551* (2014.01)
*B60L 50/64* (2019.01)
*B60L 58/26* (2019.01)
*H01M 10/613* (2014.01)
*H01M 10/625* (2014.01)
*H01M 10/6556* (2014.01)
*H01M 10/6561* (2014.01)
*H01M 50/204* (2021.01)
*H01M 50/24* (2021.01)
*H01M 50/249* (2021.01)

(52) U.S. Cl.
CPC ......... *H01M 10/6551* (2015.04); *B60L 50/64* (2019.02); *B60L 58/26* (2019.02); *H01M 10/613* (2015.04); *H01M 10/625* (2015.04); *H01M 10/6556* (2015.04); *H01M 10/6561* (2015.04); *H01M 50/204* (2021.01); *H01M 50/24* (2021.01); *H01M 50/249* (2021.01); *H01M 2220/20* (2013.01)

(58) Field of Classification Search
CPC .......... H01M 10/6551; H01M 10/613; H01M 10/625; H01M 10/6556; H01M 10/6561; H01M 50/204; H01M 50/24; H01M 50/249; H01M 2220/20; H01M 50/20; B60L 50/64; B60L 58/26; Y02E 60/10
See application file for complete search history.

(56) References Cited

U.S. PATENT DOCUMENTS

| | | | | |
|---|---|---|---|---|
| 2005/0287426 A1* | 12/2005 | Kim | ..................... | H01M 10/625 429/120 |
| 2006/0040182 A1* | 2/2006 | Kawakami | ............ | H01M 4/386 429/231.95 |
| 2006/0115720 A1* | 6/2006 | Kim | .................. | H01M 10/6557 429/120 |
| 2006/0214633 A1 | 9/2006 | Cho | | |
| 2012/0103714 A1* | 5/2012 | Choi | ........................ | B60K 1/04 180/68.5 |
| 2012/0107676 A1* | 5/2012 | Han | .................... | H01M 50/548 429/179 |
| 2016/0093932 A1 | 3/2016 | Obasih et al. | | |
| 2016/0093934 A1 | 3/2016 | Obasih et al. | | |
| 2016/0107526 A1 | 4/2016 | Jin et al. | | |
| 2016/0141573 A1* | 5/2016 | Aoki | ................... | H01M 50/512 429/53 |
| 2016/0197384 A1 | 7/2016 | DeKeuster | | |

FOREIGN PATENT DOCUMENTS

| | | |
|---|---|---|
| CN | 1808751 A | 7/2006 |
| CN | 101257103 A | 9/2008 |
| CN | 102315501 A | 1/2012 |
| CN | 102447145 A | 5/2012 |
| CN | 102468454 A | 5/2012 |
| CN | 102510702 A | 6/2012 |
| CN | 104364961 A | 2/2015 |
| CN | 104934656 A | 9/2015 |
| CN | 10530769 A | 3/2016 |
| CN | 105518899 A | 4/2016 |
| EP | 2437329 A1 | 4/2012 |
| JP | 6109926 | 10/2014 |
| JP | 2015-510230 | 4/2015 |
| JP | 2016-081844 | 5/2016 |
| JP | 2016-157580 | 9/2016 |
| KR | 10-0344515 | 9/1998 |
| KR | 10-2018-0024541 | 3/2018 |

OTHER PUBLICATIONS

International Search Report and Written Opinion of the International Searching Authority dated Jul. 24, 2019 for PCT/US2019/024996 filed Mar. 29, 2019, 11 pgs.

* cited by examiner

*Primary Examiner* — Muhammad S Siddiquee
(74) *Attorney, Agent, or Firm* — Boardman & Clark LLP (57) ABSTRACT

A battery system includes a housing configured to receive a battery cell, where the battery cell is configured to output thermal energy as a byproduct of electrical energy generation and/or consumption, a wall of the housing positioned proximate to the battery cell, and a plurality of fins extending from the wall, where the plurality of fins is configured to absorb thermal energy from the battery cell and dissipate the thermal energy to air, or a heat sink, or both, and where a fin of the plurality of fins comprises a channel configured to facilitate a flow of the air between the fin of the plurality of fins and an adjacent fin of the plurality of fins.

20 Claims, 6 Drawing Sheets

THERMAL MANAGEMENT SYSTEM FOR A BATTERY MODULE

CROSS REFERENCE TO RELATED APPLICATIONS

This application is a 371 of international PCT/US2019/024996, filed Mar. 29, 2019, which claims priority from and the benefit of U.S. Provisional Application Ser. No. 62/654,091, entitled "THERMAL MANAGEMENT SYSTEM FOR A BATTERY MODULE," filed Apr. 6, 2018, and which is hereby incorporated by reference in its entirety for all purposes.

BACKGROUND

The present disclosure relates generally to the field of batteries and battery modules. More specifically, the present disclosure relates to a thermal management system for a battery module.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved battery module components that are used in xEVs. For instance, battery modules include one or more battery cells that generate thermal energy (e.g., heat), which may increase a temperature within a housing of the battery module. Existing battery modules may include various features that transfer thermal energy from within the battery module to a heat sink and/or a surrounding environment of the battery module. Unfortunately, existing features may be inefficient at removing thermal energy from the battery module and/or may be expensive and complex to incorporate into the battery module. The present disclosure is generally related to features that improve heat dissipation from within a battery module housing.

SUMMARY

In an embodiment of the present disclosure, a battery system includes a housing configured to receive a battery cell, where the battery cell is configured to output thermal energy as a byproduct of electrical energy generation and/or consumption, a wall of the housing positioned proximate to the battery cell, and a plurality of fins extending from the wall, where the plurality of fins is configured to absorb thermal energy from the battery cell and dissipate the thermal energy to air, or a heat sink, or both, and where a fin of the plurality of fins comprises a channel configured to facilitate a flow of the air between the fin of the plurality of fins and an adjacent fin of the plurality of fins.

In an embodiment of the present disclosure, a battery system includes a housing configured to receive a battery cell, where the battery cell is configured to output thermal energy as a byproduct of electrical energy generation and/or consumption, a wall of the housing positioned proximate to the battery cell, a plurality of fins extending from the wall, where the plurality of fins is configured to absorb thermal energy from the battery cell and dissipate the thermal energy to air, or a heat sink, or both, and a projection extending from the wall and into an opening between adjacent fins of the plurality of fins.

In an embodiment of the present disclosure, a battery system includes a housing configured to receive a battery cell, where the battery cell is configured to output thermal energy as a byproduct of electrical energy generation and/or consumption, a wall of the housing positioned proximate to the battery cell, a plurality of fins extending from the wall, wherein the plurality of fins is configured to absorb thermal energy from the battery cell and dissipate the thermal energy to air, or a heat sink, or both, where a fin of the plurality of fins comprises a channel configured to facilitate a flow of the air between the fin of the plurality of fins and an adjacent fin of the plurality of fins, and a projection extending from the wall and into an opening between the fin and the adjacent fin of the plurality of fins.

DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

Based on the advantages over traditional gas-power vehicles, manufacturers, which generally produce traditional gas-powered vehicles, may desire to utilize improved vehicle technologies (e.g., regenerative braking technology) within their vehicle lines. Often, these manufacturers may utilize one of their traditional vehicle platforms as a starting point. Accordingly, since traditional gas-powered vehicles are designed to utilize 12 volt battery systems, a 12 volt lithium ion battery may be used to supplement a 12 volt lead-acid battery. More specifically, the 12 volt lithium ion battery may be used to more efficiently capture electrical energy generated during regenerative braking and subsequently supply electrical energy to power the vehicle's electrical system.

As advancements occur with vehicle technologies, high voltage electrical devices requiring voltage higher than 12 volts may also be included in the vehicle's electrical system. For example, the lithium ion battery may supply electrical energy to an electric motor in a mild-hybrid vehicle. Often, these higher voltage electrical devices utilize voltage greater than 12 volts, for example, up to 48 volts. Accordingly, in some embodiments, the output voltage of a 12 volt lithium ion battery may be boosted using a DC-DC converter to supply power to the high voltage devices. Additionally or alternatively, a 48 volt lithium ion battery may be used to supplement a 12 volt lead-acid battery. More specifically, the 48 volt lithium ion battery may be used to more efficiently capture electrical energy generated during regenerative braking and subsequently supply electrical energy to power the high voltage devices.

Thus, the design choice regarding whether to utilize a 12 volt lithium ion battery or a 48 volt lithium ion battery may depend directly on the electrical devices included in a particular vehicle. Nevertheless, although the voltage characteristics may differ, the operational principles of a 12 volt lithium ion battery and a 48 volt lithium ion battery are generally similar. More specifically, as described above, both may be used to capture electrical energy during regenerative braking and subsequently supply electrical energy to power electrical devices in the vehicle.

Accordingly, to simplify the following discussion, the present techniques will be described in relation to a battery system with a 12 volt lithium ion battery and a 12 volt lead-acid battery. However, one of ordinary skill in art is able to adapt the present techniques to other battery systems, such as a battery system with a 48 volt lithium ion battery and a 12 volt lead-acid battery.

The present disclosure relates to batteries and battery modules. More specifically, the present disclosure relates to features of a battery module housing that are configured to improve dissipation of thermal energy (e.g., heat) generated by one or more battery cells positioned within the battery module housing. Particular embodiments are directed to lithium ion battery modules that may be used in vehicular contexts (e.g., hybrid electric vehicles) as well as other energy storage/expending applications (e.g., energy storage for an electrical grid).

With the preceding in mind, the present disclosure describes improved features of a battery module housing that increase dissipation of thermal energy (e.g., heat) from within the battery module housing. As set forth above, one or more battery cells disposed within the battery module housing generate thermal energy as a result or byproduct of chemical reactions that ultimately create electrical energy, which may be supplied to, or consumed by, a load (e.g., a vehicle). The thermal energy increases a temperature within the battery module housing. In some cases, the increased temperature may affect operation of various components (e.g., the battery cells and/or electrical components) within the housing. Embodiments of the present disclosure are related to features of a battery module housing that enhance the dissipation of thermal energy generated within the battery module housing. Specifically, embodiments of the present disclosure are directed to a grid of fins that increase an amount of thermal dissipation through natural convection (e.g., passive transfer of thermal energy). In some embodiments, the fins may include channels or grooves that facilitate a flow of air between openings formed by the fins and/or between the fins and a surrounding environment. Further, the fins may contact a heat sink (e.g., a steel plate, a thermally conductive metal, aluminum, copper, a chassis of a vehicle) that absorbs thermal energy from the fins and further enhances thermal energy dissipation. In some embodiments, the heat sink may include a thermally conductive metal, such as aluminum or copper, that is positioned proximate to, or coupled to, a portion of the battery module housing having the fins. The heat sink may include a shape that conforms to a cross-sectional shape of the battery module housing, which may include a rectangular shape, a triangular shape, a hexagonal shape, or any other suitable shape.

The grid of fins is configured to balance an amount of surface area contacting the heat sink, a stiffness of the fins for supporting the battery module housing, and/or an amount of features for facilitating air flow between the openings formed by the fins and/or between the fins and the surrounding environment. In some embodiments, the grid of fins is integral with the battery module housing, thereby facilitating assembly of the battery module and reducing costs. In any case, the grid of fins increases thermal energy dissipation from within the battery module housing, thereby increasing an efficiency of the battery module.

Figure 1:
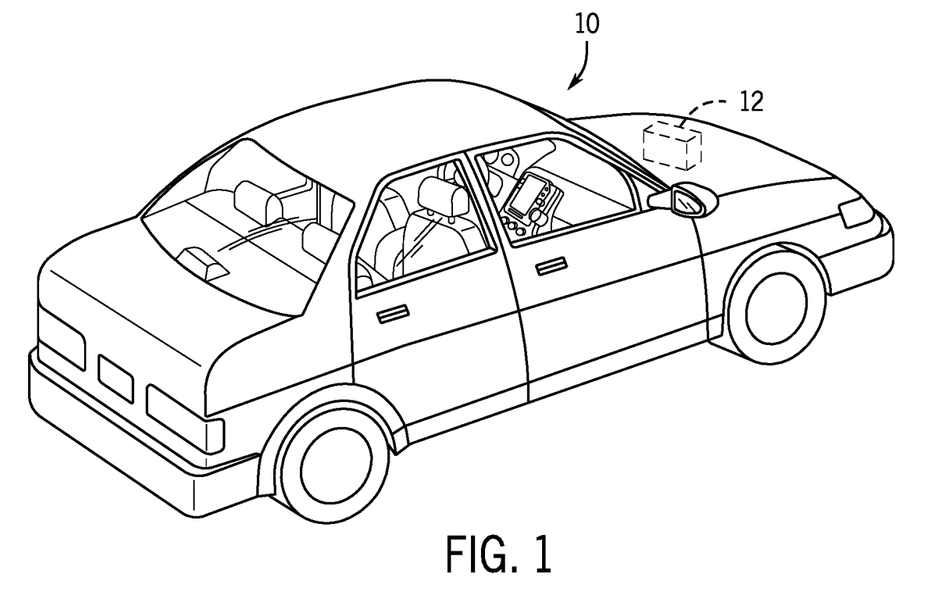
FIG. 1 is perspective view of a vehicle (an xEV) having a battery system contributing all or a portion of the power for the vehicle, in accordance with an embodiment of the present approach.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
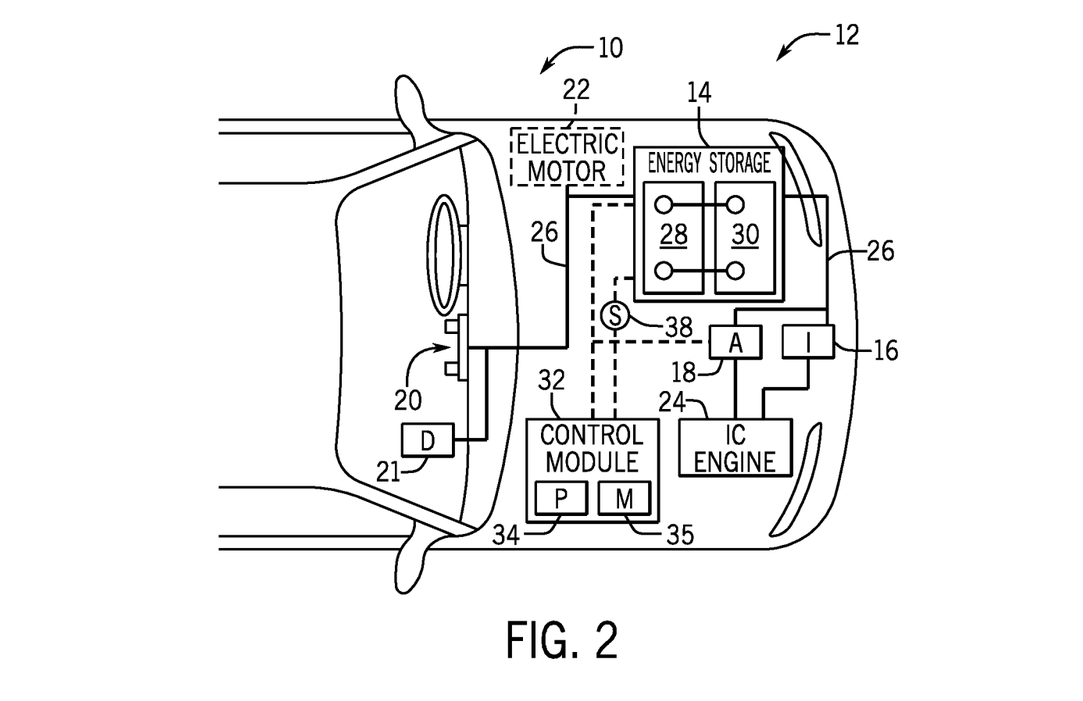
FIG. 2 is a cutaway schematic view of the xEV of FIG. 1 in the form of a hybrid electric vehicle (HEV), in accordance with an embodiment of the present approach.

A more detailed view of the battery system 12 is described in FIG. 2. As depicted, the battery system 12 includes an energy storage component 14 coupled to an ignition system 16, an alternator 18, a vehicle console 20, and optionally to an electric motor 22. Generally, the energy storage component 14 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 14 supplies power to the vehicle console 20, a display 21 within the vehicle, and the ignition system 16, which may be used to start (e.g., crank) an internal combustion engine 24.

Additionally, the energy storage component 14 may capture electrical energy generated by the alternator 18 and/or the electric motor 22. In some embodiments, the alternator 18 may generate electrical energy while the internal combustion engine 24 is running. More specifically, the alternator 18 may convert the mechanical energy produced by the rotation of the internal combustion engine 24 into electrical energy. Additionally or alternatively, when the vehicle 10 includes an electric motor 22, the electric motor 22 may generate electrical energy by converting mechanical energy produced by the movement of the vehicle 10 (e.g., rotation of the wheels) into electrical energy. Thus, in some embodiments, the energy storage component 14 may capture electrical energy generated by the alternator 18 and/or the electric motor 22 during regenerative braking. As such, the alternator 18 and/or the electric motor 22 are generally referred to herein as a regenerative braking system.

To facilitate capturing and supplying electric energy, the energy storage component 14 may be electrically coupled to the vehicle's electric system via a bus 26. For example, the bus 26 may enable the energy storage component 14 to receive electrical energy generated by the alternator 18 and/or the electric motor 22. Additionally, the bus 26 may enable the energy storage component 14 to output electrical energy to the ignition system 16 and/or the vehicle console 20. Accordingly, when a 12 volt battery system 12 is used, the bus 26 may carry electrical power typically between 8-18 volts.

Additionally, as depicted, the energy storage component 14 may include multiple battery modules. For example, in the depicted embodiment, the energy storage component 14 includes a lead acid (e.g., a first) battery module 28 in accordance with present embodiments, and a lithium ion (e.g., a second) battery module 30, where each battery module 28, 30 includes one or more battery cells. In other embodiments, the energy storage component 14 may include any number of battery modules. Additionally, although the first battery module 28 and the second battery module 30 are depicted adjacent to one another, they may be positioned in different areas around the vehicle. For example, the second battery module 30 may be positioned in or about the interior of the vehicle 10 while the first battery module 28 may be positioned under the hood of the vehicle 10.

In some embodiments, the energy storage component 14 may include multiple battery modules to utilize multiple different battery chemistries. For example, the first battery module 28 may utilize a lead-acid battery chemistry and the second battery module 30 may utilize a lithium ion battery chemistry. In such an embodiment, the performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the battery system 12 may be improved.

To facilitate controlling the capturing and storing of electrical energy, the battery system 12 may additionally include a control module 32. More specifically, the control module 32 may control operations of components in the battery system 12, such as relays (e.g., switches) within energy storage component 14, the alternator 18, and/or the electric motor 22. For example, the control module 32 may regulate amount of electrical energy captured/supplied by each battery module 28 or 30 (e.g., to de-rate and re-rate the battery system 12), perform load balancing between the battery modules 28 and 30, determine a state of charge of each battery module 28 or 30, determine temperature of each battery module 28 or 30, determine a predicted temperature trajectory of either battery module 28 and 30, determine predicted life span of either battery module 28 or 30, determine fuel economy contribution by either battery module 28 or 30, determine an effective resistance of each battery module 28 or 30, control magnitude of voltage or current output by the alternator 18 and/or the electric motor 22, and the like.

Accordingly, the control module (e.g., unit) 32 may include one or more processors 34 and one or more memories 36. More specifically, the one or more processors 34 may include one or more application specific integrated circuits (ASICs), one or more field programmable gate arrays (FPGAs), one or more general purpose processors, or any combination thereof. Generally, the processor 34 may perform computer-readable instructions related to the processes described herein. Additionally, the processor 34 may be a fixed-point processor or a floating-point processor.

Additionally, the one or more memories 36 may include volatile memory, such as random access memory (RAM), and/or non-volatile memory, such as read-only memory (ROM), optical drives, hard disc drives, or solid-state drives. In some embodiments, the control module 32 may include portions of a vehicle control unit (VCU) and/or a separate battery control module. Additionally, as depicted, the control module 32 may be included separate from the energy storage component 14, such as a standalone module. In other embodiments, the battery management system (BMS) may be included within the energy storage component 14.

In certain embodiments, the control module 32 or the processor 34 may receive data from various sensors 38 disposed within and/or around the energy storage component 14. The sensors 38 may include a variety of sensors for measuring current, voltage, temperature, and the like regarding the battery module 28 or 30. After receiving data from the sensors 38, the processor 34 may convert raw data into estimations of parameters of the battery modules 28 and 30. As such, the processor 34 may render the raw data into data that may provide an operator of the vehicle 10 with valuable information pertaining to operations of the battery system 12, and the information pertaining to the operations of the battery system 12 may be displayed on the display 21. The display 21 may display various images generated by device 10, such as a GUI for an operating system or image data (including still images and video data). The display 21 may be any suitable type of display, such as a liquid crystal display (LCD), plasma display, or an organic light emitting diode (OLED) display, for example. Additionally, the display 21 may include a touch-sensitive element that may provide inputs to the adjust parameters of the control module 32 or data processed by the processor 34.

The energy storage component 14 may have dimensions comparable to those of a typical lead-acid battery to limit modifications to the vehicle 10 design to accommodate the battery system 12. For example, the energy storage component 14 may be of similar dimensions to an H6 battery, which may be approximately 13.9 inches×6.8 inches×7.5 inches. As depicted, the energy storage component 14 may be included within a single continuous housing. In other embodiments, the energy storage component 14 may include multiple housings coupled together (e.g., a first housing including the first battery 28 and a second housing including the second battery 30). In still other embodiments, as mentioned above, the energy storage component 14 may include the first battery module 28 located under the hood of the vehicle 10, and the second battery module 30 may be located within the interior of the vehicle 10.

Figure 3:
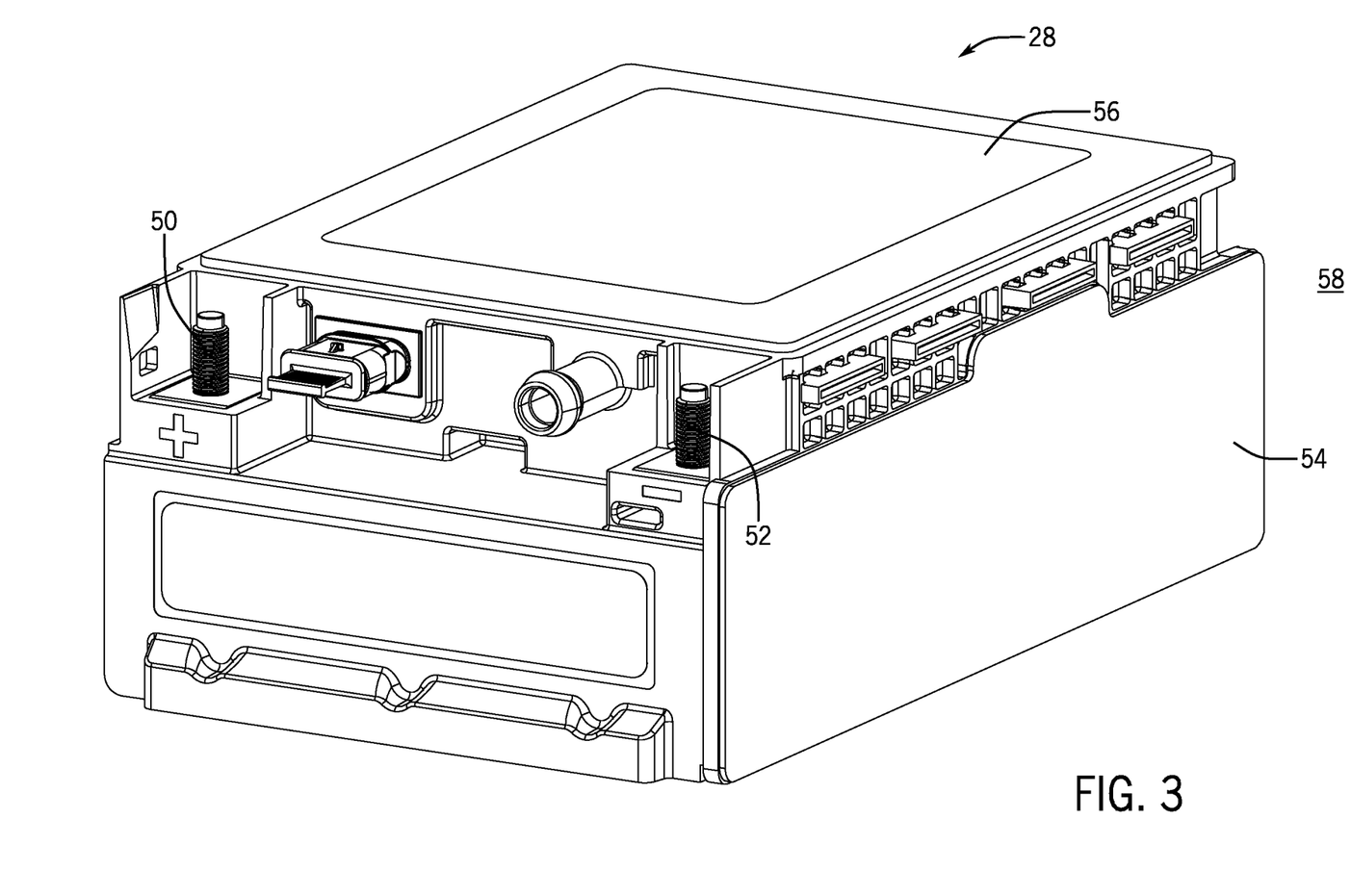
FIG. 3 is a perspective view of an embodiment of the battery system of FIG. 1, in accordance with an embodiment of the present approach.

FIG. 3 is a perspective view of an embodiment of the battery 28 that includes a first battery module terminal 50 and a second battery module terminal 52. The battery module terminals 50, 52 are disposed on a battery module housing 54 and are electrically coupled to one or more battery cells disposed within a cavity of the housing 54. As such, a load or a power supply may be coupled to the battery module terminals 50, 52, such that the battery 28 supplies and/or receives electrical power. As shown in the illustrated embodiment of FIG. 3, the cavity of the housing 54 is sealed via a cover 56. In some embodiments, the cover 56 is secured to the housing 54 via a weld (e.g., a laser weld), fasteners, another suitable technique, or a combination thereof. In any case, the cavity of the housing is substantially sealed (e.g., air-tight or water-tight) to block gases or fluids within the housing from leaking into an environment 58 surrounding the battery 28 and/or to block water or other contaminants from entering into the housing from the environment 58 surrounding the battery 28. In some embodiments, the battery module housing 54 and/or the cover 56 may include a polymeric material, such as polypropylene, nylon, or another suitable material. Additionally, the polymeric material of the battery module housing 54 and/or the cover 56 may include an additive, such as a glass fiber additive. However, in other embodiments, the battery module housing 54 and/or the cover 56 may include any suitable material.

Figure 4:
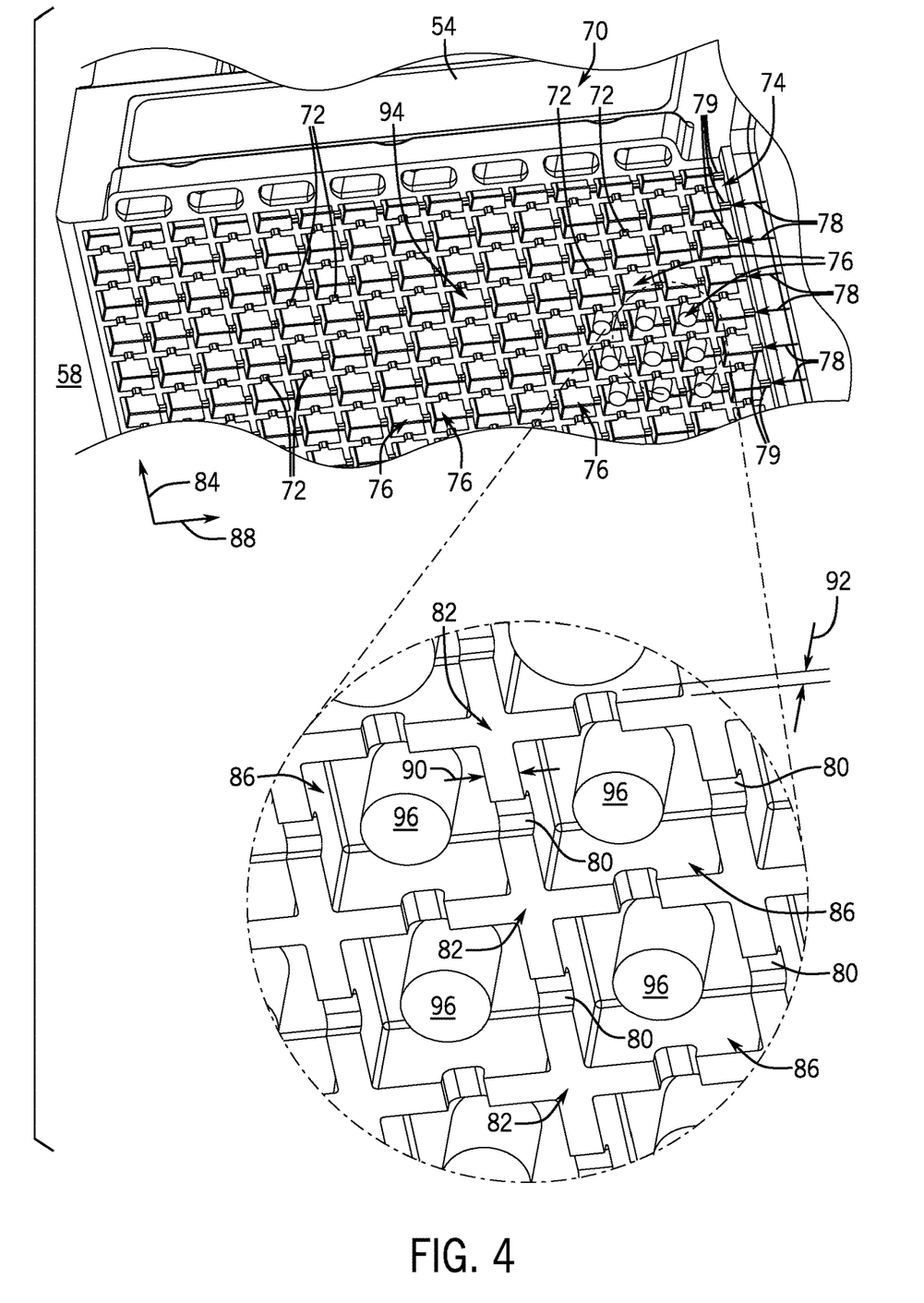
FIG. 4 is a perspective view of an embodiment of a thermal management system for the battery system of FIG. 1, in accordance with an embodiment of the present approach.

As discussed above, one or more battery cells disposed within the cavity of the housing 54 generate thermal energy to produce electrical energy, which is ultimately supplied to a load via the battery module terminals 50, 52. Embodiments of the present disclosure are directed to an improved thermal energy management system 70 that increases an amount of thermal energy dissipation from within the battery module housing 54. For example, FIG. 4 is a perspective view of an embodiment of the thermal energy management system 70. As shown in the illustrated embodiment of FIG. 4, the thermal energy management system 70 includes a plurality of fins 72 forming a grid-like structure on a portion 74 (e.g., bottom surface) of the battery module housing 54. For example, the plurality of fins 72 include projections from the portion 74 of the housing 54. The plurality of fins 72 form openings 76 that are configured to receive and/or otherwise enclose pockets of air. In some embodiments, the openings 76 receive air 78 from the environment 58 (e.g., outside air) surrounding the battery 28, which may flow through channels or openings 79 formed in the portion 74 of the battery module housing 54 and absorb thermal energy from the fins 72. Additionally or alternatively, a fan or other suitable device may be utilized to direct air from the environment 58 across the plurality of fins 72 and/or between the openings 76. In other embodiments, the plurality of fins 72 may be isolated from the environment 58. In such embodiments, air present within the openings 76 may flow across the plurality of fins 72 to adjacent openings 76, thereby distributing thermal energy substantially evenly between the each of the openings 76.

In some embodiments, the plurality of fins 72 is integrally formed with the battery module housing 54. For example, the battery module housing 54, and thus the plurality of fins 72, may be formed via an injection molding technique. Integrally forming the plurality of fins 72 with the battery module housing 54 reduces manufacturing costs by eliminating an additional component that is included to dissipate heat from within the battery module housing 54. Accordingly, the plurality of fins 72 and/or the portion 74 of the battery module housing 54 may include the same material as the battery module housing 54, such as polypropylene, nylon, or another suitable material. Further as set forth above, the battery module housing 54, and thus the plurality of fins 72 and/or the portion 74, may include an additive within the polypropylene, nylon, or another suitable material, such as a glass fiber additive.

In some embodiments, the plurality of fins 72 include a plurality of channels 80 (e.g., grooves) that are formed within at least a portion 82 of one or more fins 72 of the plurality of fins 72. As shown in the illustrated embodiment of FIG. 4, the channels 80 are formed on portions 82 of the plurality of fins 72 extending along an axis 84. Additionally, portions 86 of the plurality of fins 72 extending along an axis 88, crosswise to axis 84, may also include the channels 80. In other embodiments, the portions 86 of the plurality of fins 72 may not include the channels 80 and/or the portions 82 may not include the channels 80. The number of channels 80 included within the plurality of fins 72 may be based on a desired stiffness of the plurality of fins 72. For example, forming a large number of the channels 80 within the plurality of fins 72 may reduce the stiffness of the plurality of fins 72, which may compromise the structural integrity of the battery module housing 54. Accordingly, the number of channels 80 may be determined based on a stiffness of the plurality of fins 72 to maintain the structural integrity of the battery module housing 54.

As shown, the channels 80 extend across a length 90 of the portions 82 and extend a depth 92 into the portions 82. In some embodiments, the depth 92 of the channels 80 is between 0.1 millimeters (mm) and 2 mm, between 0.2 mm and 1 mm, or between 0.3 mm and 0.7 mm. In any case, the channels 80 are configured to facilitate a flow of air across each of the plurality of fins 72. As such, thermal energy within a center 94 of the portion 74 of the housing 54 may be absorbed by ambient air and dissipated into the environment 58 surrounding the battery 28 and/or transferred to openings 76 further away from the center 94 of the portion 74 of the housing 54.

In some embodiments, the battery module housing 54 may further include one or more projections 96 that extend from the portion 74 and into the openings 76. The projections 96 may increase an amount of surface area exposed to air, thereby increasing an amount of thermal energy dissipated from within the housing 54. As shown in the illustrated embodiment of FIG. 4, the projections 96 may include a substantially cylindrical shape. However, in other embodiments, the projections 96 may include other suitable polygonal shapes that increase a surface area of the thermal management system 70 exposed to air. Additionally or alternatively, the projections 96 may include a length that is less than a length of the plurality of fins 72. As such, the projections 96 do not block a flow of air across the grid (e.g., between openings 76) formed by the plurality of fins 72, thereby enabling an increased amount thermal energy transfer. In other embodiments, the projections 96 may include substantially the same (e.g., within 10% of, within 5% of, within 1% of) length as the plurality of fins 72. In still further embodiments, the projections 96 may include another suitable length.

Figure 5:
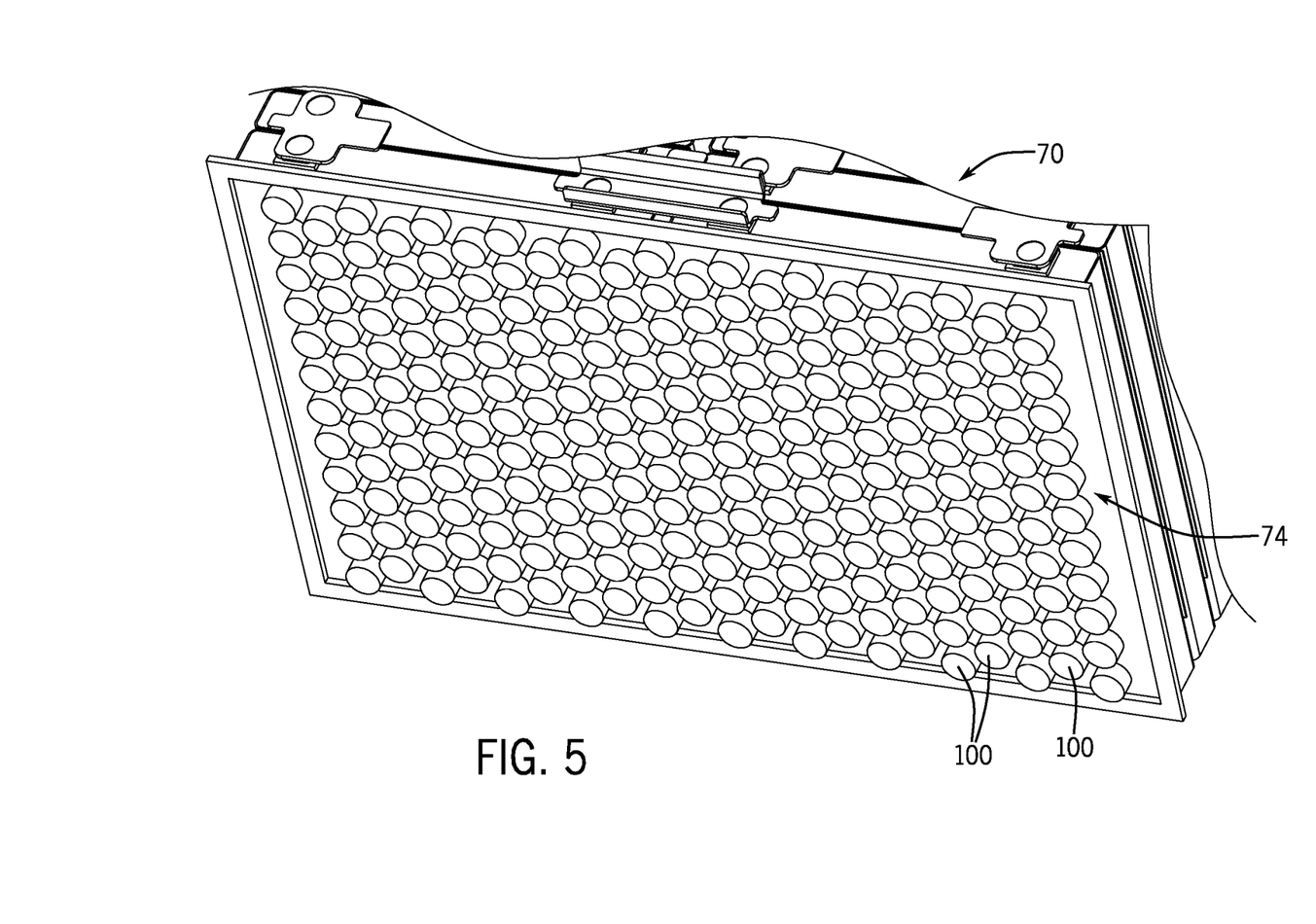
FIG. 5 is a perspective view of an embodiment of the thermal management system for the battery system of FIG. 1, in accordance with an embodiment of the present approach.

While the illustrated embodiment of FIG. 4 shows the plurality of fins 72 having a substantially square shape (e.g., cross-sectional shape), it should be recognized that the plurality of fins 72 may include other suitable shapes (e.g., cross-sectional shapes). For instance, FIG. 5 is a perspective view of an embodiment of the battery having the thermal management system 70 with cylindrical shaped fins 100 (e.g., circular cross-sectional shape). In still further embodiments, the plurality of fins 72 may include a cross-sectional shape that is circular, triangular, rectangular, square, pentagonal, hexagonal, heptagonal, octagonal, nonagonal, another suitable polygonal shape, or a combination thereof.

Figure 6:
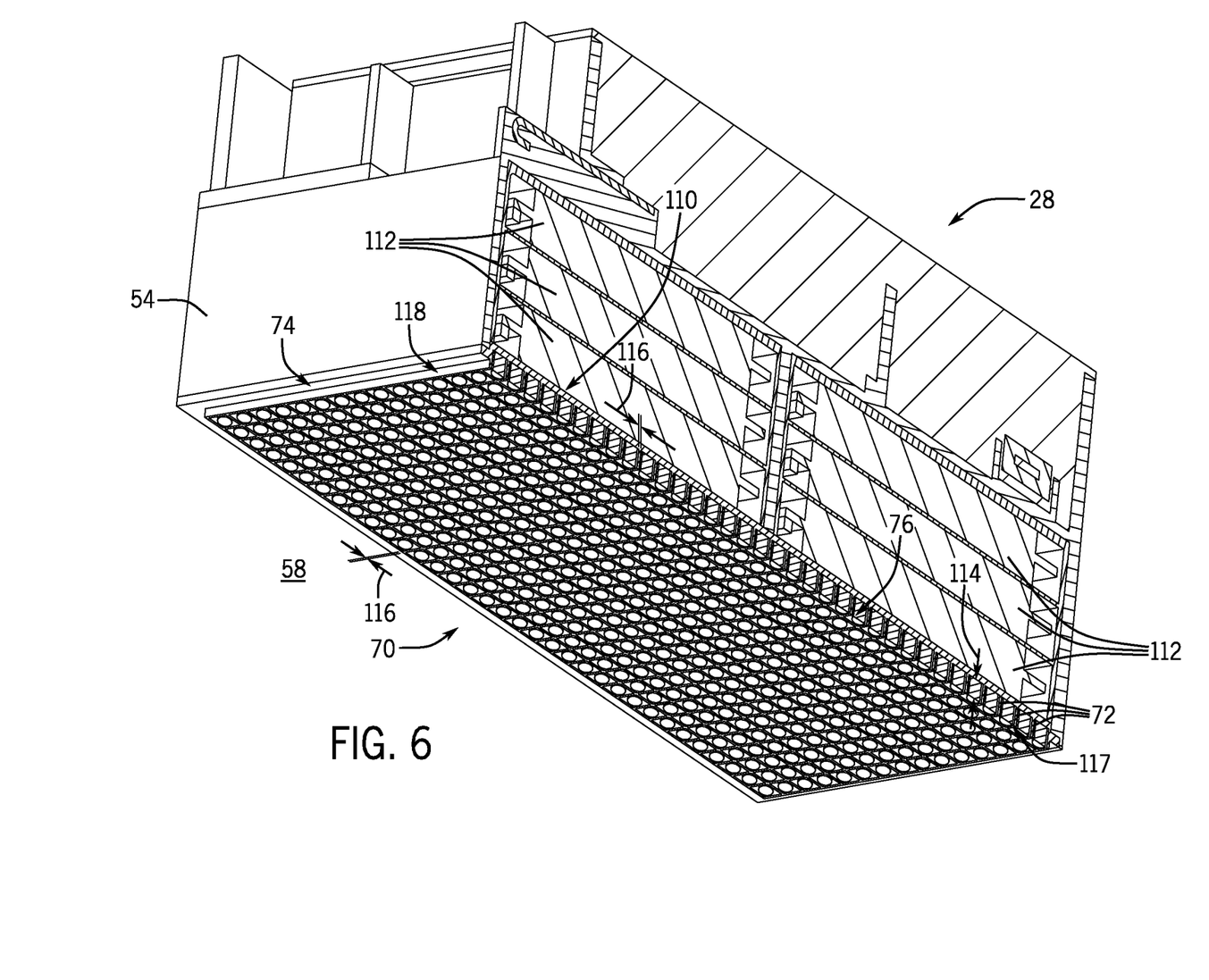
FIG. 6 is a cross-section of an embodiment of the thermal management system of FIG. 4, in accordance with an embodiment of the present approach.

FIG. 6 is a cross-section of the battery 28 having the thermal energy management system 70. As shown in the illustrated embodiment of FIG. 5, the plurality of fins 72 extend from a wall 110 (e.g., a pad or the portion 74) positioned adjacent to a plurality of battery cells 112. In some embodiments, the wall 110 may be integrally formed with the battery module housing 54 and include a thickness that is approximately (e.g., within 10% of, within 5% of, or within 1% of) 2 mm. In any case, the wall 110 absorbs thermal energy generated by the plurality of battery cells 112 and ultimately transfers the thermal energy to the plurality of fins 72. As discussed above, air may flow across the plurality of fins 72 and absorb thermal energy from the plurality of fins 72. In some cases, the thermal energy is dissipated to the environment 58, while in other cases, the thermal energy is distributed to adjacent openings 76 formed by the plurality of fins 72. In some embodiments, the plurality of fins 72 may extend a distance 114 (e.g., a length) from the wall 110. For example, the distance 114 may be between 2 millimeters (mm) and 6 mm, between 2.5 mm and 5 mm, or between 3 mm and 4 mm. In other embodiments, the distance 114 may be approximately (e.g., within 10% of, within 5% of, or within 1% of) 3.88 mm.

Additionally, the plurality of fins 72 may include a thickness 116. The thickness 116 of the plurality of fins 72 determines a surface area exposed to the ambient air as well as a surface area contacting a heat sink (see, e.g., FIG. 7). As such, the plurality of fins 72 dissipate thermal energy from within the battery module housing 54 via ambient air and through the heat sink. The thickness 116 of the plurality of fins 72 may be determined by balancing the various surface areas (e.g., a first surface area exposed to ambient air and a second surface area contacting the heat sink) to achieve a threshold amount of thermal energy transfer. Such determination may be made through experimental testing, models of existing data, and/or other suitable techniques. Further, in some embodiments, the thickness 116 of the fins 72 may vary throughout the distance 114 from the wall 110. For instance, the thickness 116 may taper from the wall 110 toward distal ends 117 of the plurality of fins 72. In such embodiments, a greater amount of thermal energy may be absorbed from the wall 110 by the plurality of fins 72, thereby increasing an amount of thermal energy dissipation achieved by the plurality of fins 72. Additionally or alternatively, the thickness 116 of the plurality of fins 72 may be substantially equal along a cross-section of each fin of the plurality of fins 72. In other words, sides of the fins 72 that form the cross-sectional shape of the fins 72 may include substantially the same thickness 116 at any point along the distance 114.

As shown in the illustrated embodiment of FIG. 6, the grid formed by the plurality of fins 72 may be substantially surrounded by a channel 118 formed around a perimeter of the portion 74 of the battery module housing 54. In some embodiments, the channel 118 may receive ambient air from the environment 58 surrounding the battery 28 and enable the ambient air to be directed across the plurality of fins 72, such that thermal energy from within the battery module housing 54 is absorbed and dissipated to the environment 58. Additionally or alternatively, the channel 118 provide structural support to the battery module housing 54 by providing a buffer between the grid formed by the plurality of fins 72 and a perimeter of the battery module housing 54.

Figure 7:
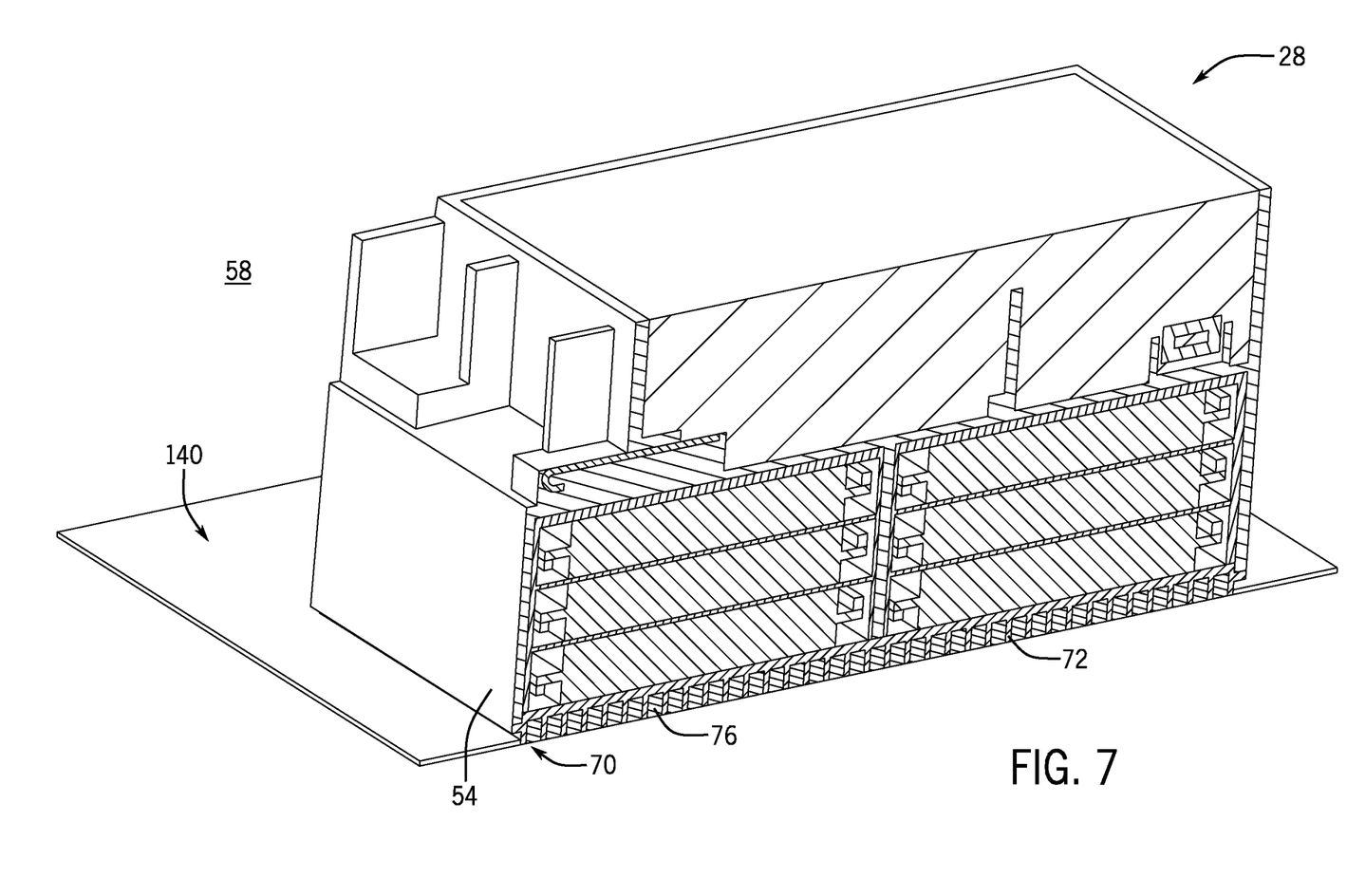
FIG. 7 is a cross-section of an embodiment of the thermal management system of FIG. 4, in accordance with an embodiment of the present approach.

FIG. 7 is a cross-section of an embodiment of the battery 28 having the thermal management system 70. As shown in the illustrated embodiment of FIG. 7, the battery module housing 54 is disposed on a heat sink 140 (e.g., a steel plate, a metallic sheet, a chassis of a vehicle, copper, aluminum, or another conductive material). As such, the plurality of fins 72 contact, or are otherwise adjacent to, the heat sink 140. The heat sink 140 absorbs thermal energy from the plurality of fins 72 and/or the air flowing across the plurality of fins 72. Accordingly, the thermal management system 70 enables thermal energy to be transferred to both the heat sink 140 and to air within the openings 76, thereby increasing an amount of thermal energy dissipation and increasing an efficiency of the battery 28.

One or more of the disclosed embodiments, alone or in combination, may provide one or more technical effects including enhancing thermal energy dissipation from a battery module housing. In particular, a battery module housing includes a grid-like structure formed by a plurality of fins. The fins may include a channel that facilitates air flow between openings formed by the fins, thereby distributing thermal energy throughout the grid-like structure. In some embodiments, ambient air may flow into the openings formed by the plurality of fins to further increase thermal energy dissipation from within the battery module housing. Further, a heat sink may be utilized to absorb thermal energy from the plurality of fins and/or air within the openings formed by the fins. In any case an amount of thermal energy dissipated from within the battery module housing is increased, thereby enhancing an efficiency of the battery module. The technical effects and technical problems in the specification are exemplary and are not limiting. It should be noted that the embodiments described in the specification may have other technical effects and can solve other technical problems.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A battery system, comprising:
   an enclosed housing having an internal volume;
   a battery cell provided in the internal volume, wherein the battery cell is configured to output thermal energy as a byproduct of electrical energy generation and/or consumption;
   a wall of the enclosed housing with a first side positioned proximate to the battery cell; and
   a plurality of fins extending from a second side of the wall external to the enclosed housing, the plurality of fins being arranged in a grid-like structure and configured to absorb thermal energy from the battery cell and dissipate the thermal energy to air, or a heat sink, or both, wherein a fin of the plurality of fins comprises a channel configured to facilitate a flow of the air between the fin of the plurality of fins and an adjacent fin of the plurality of fins.

2. The battery system of claim 1, wherein an opening is formed between the fin and the adjacent fin of the plurality of fins.

3. The battery system of claim 2, comprising a projection configured to extend from the second side of the wall and into the opening.

4. The battery system of claim 3, wherein a first length of the projection is less than a second length of each fin of the plurality of fins.

5. The battery system of claim 3, wherein the projection comprises a cylindrical shape.

6. The battery system of claim 1, comprising a heat sink disposed adjacent to distal ends of each fin of the plurality of fins, wherein the heat sink is configured to absorb thermal energy from a fin of the plurality of fins.

7. The battery system of claim 6, wherein the heat sink comprises a thermally conductive metal.

8. The battery system of claim 1, wherein the wall and the plurality of fins are integral to the enclosed housing.

9. The battery system of claim 1, wherein the enclosed housing, the wall, and the plurality of fins comprise polypropylene or nylon.

10. The battery system of claim 9, wherein the enclosed housing, the wall, and the plurality of fins comprise a glass fiber additive.

11. The battery system of claim 1, wherein a thickness of a fin of the plurality of fins is configured to taper from the wall toward a distal end of the fin of the plurality of fins.

12. The battery system of claim 1, wherein the plurality of fins comprise a substantially rectangular cross-sectional shape.

13. A battery system, comprising:
   Rail an enclosed housing having an internal volume;
   a battery cell provided in the internal volume, wherein the battery cell is configured to output thermal energy as a byproduct of electrical energy generation and/or consumption;
   a wall of the enclosed housing with a first side positioned proximate to the battery cell;
   a plurality of fins extending from a second side of the wall external to the enclosed housing, the plurality of fins being arranged in a grid-like structure and configured to absorb thermal energy from the battery cell and dissipate the thermal energy to air, or a heat sink, or both; and
   a projection extending from the wall and into an opening between adjacent fins of the plurality of fins.

14. The battery system of claim 13, wherein the projection comprises a cylindrical shape.

15. The battery system of claim 13, wherein a first length of the projection is less than a second length of each fin of the plurality of fins.

16. The battery system of claim 13, wherein the enclosed housing, the wall, and the plurality of fins comprise polypropylene or nylon.

17. A battery system, comprising:
- an enclosed housing having an internal volume;
- a battery cell provided in the internal volume, wherein the battery cell is configured to output thermal energy as a byproduct of electrical energy generation and/or consumption;
- a wall of the enclosed housing with a first side positioned proximate to the battery cell;
- a plurality of fins extending from a second side of the wall external to the enclosed housing, the plurality of fins being arranged in a grid-like structure and configured to absorb thermal energy from the battery cell and dissipate the thermal energy to air, or a heat sink, or both, wherein each fin of the plurality of fins and an adjacent fin to the each fin forms an opening, thereby resulting in a plurality of openings, and wherein the each fin of the plurality of fins includes a groove at a distal end of the each fin to form a channel for the air; and
- a projection extending from the second side of the wall and into a respective opening between the fin and the adjacent fin of the plurality of fins.

18. The battery system of claim 17, wherein a thickness of a fin of the plurality of fins is configured to taper from the wall toward a distal end of the fin of the plurality of fins.

19. The battery system of claim 17, wherein the wall and the plurality of fins are integral to the enclosed housing.

20. The battery system of claim 19, wherein the plurality of fins form the grid-like structure extending across a length of a bottom of the enclosed housing.

* * * * *